UNITED STATES PATENT OFFICE 2,594,408

THIOPHENE DERIVATIVES

William S. Emerson and Tracy M. Patrick, Jr., Dayton, Ohio, assignors to Monsanto Chemical Company, St. Louis, Mo., a corporation of Delaware No Drawing. Application September 24, 1948, Serial No. 51,104

5 Claims. (Cl. 260—329)

This invention relates to new thiophene derivatives having unusual value as accelerators in rubber compounding. More specifically the invention relates to new derivatives of thiophene and dithiocarbamic acid.

The primary purpose of this invention is to develop new and useful products from thiophene. A further purpose is to prepare new rubber vulcanization accelerators. Other purposes will be apparent from the description of the invention set forth hereinafter.

The new chemical compounds have the structure:

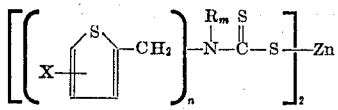

wherein X is a radical of the group consisting of hydrogen, halogen, and alkyl radicals having from one to four carbon atoms, R is a hydrocarbon radical having up to eight carbon atoms, $n$ is a small whole number from one (1) to two (2), inclusive, $m$ is a small whole number from zero (0) to one (1), inclusive, and the sum of $n$ and $m$ is always two (2).

The new compounds are made by reacting dithenylamine or any of the various mixed thenylalklyamines, mixed thenylarylamines, or the mixed thenylaralkylamines with carbon disulfide in a basic solution, and then reacting the resulting compound with a soluble zinc salt. In the preparation of compounds of the above structural formula, wherein $n$ equals two and $m$ equals zero, the dithenylamine, a bis-(halogen-substituted thenyl)amine, such as bis-(5-chloro-2-thenyl)amine, bis-(3 - bromo - 2-thenyl)amine, bis-(5-fluoro-2-thenyl)amine, or bis-(4-iodo-2-thenyl)amine, or an alkyl-substituted thenylamine, such as bis-(5-methyl-2-thenyl)amine, bis-(4-ethyl-2-thenyl)amine, or bis-(3-isobutyl-2-thenyl)amine are used. In the preparation of compounds having a single thenyl or substituted thenyl group, the mixed secondary amines are used, for example thenylmethylamine, N-(5-chloro-2-thenyl)cyclohexylamine, N-(4-bromo-2-thenyl)benzylamine, N-(5 - methyl-2-thenyl)-isopropylamine, N - (3 - fluoro-2-thenyl)hexylamine, and N-(2-thenyl)aniline. Many of these secondary amines are new compounds which may readily be prepared from the corresponding thiophenes by reaction with formaldehyde and the primary amines corresponding to the nonthiophene radical desired. Generally it is desirable to use a salt of the primary amine and heat it in aqueous solution with formaldehyde and the desired thiophene at reflux temperature. The secondary amines are recovered by extracting the reaction mass with benzene after neutralization with alkali and distilling under reduced pressure.

After obtaining the desired amine, such as dithenylamine, one of the corresponding substituted thenylamines, a mixed thenylalkylamine, a mixed thenylaralkylamine, a mixed thenylarylamine or one of the corresponding mixed secondary substituted thenylamines, the conversion to the thiocarbamate salt is achieved by reacting the secondary amine with carbon disulfide in the presence of a suitable strong alkali, for example sodium hydroxide, whereby the sodium salt is synthesized. The salt of the thenyl-substituted dithiocarbamate is then treated with a soluble zinc salt, for example zinc chloride in aqueous solution to prepare the new zinc salts. The latter reaction is preferably effected by mixing the secondary amine with a stoichiometric quantity of dilute alkali, and adding a water solution of a zinc salt gradually thereto, using a suitable cooling means, for example cold water or ice bath, to avoid excessive temperatures.

The new zinc salts of thenyl-substituted dicarboxylic acids of the type described are unusually effective vulcanization accelerators for natural and synthetic rubber. These desirable accelerator properties are not readily apparent from the nature of the compound, and could not have been predicted since the corresponding derivative prepared from monothenylamine is not a useful vulcanization accelerator.

Further details of the preparation of the new compounds are set forth with respect to the following examples.

*Example 1*

A 500 ml., 3-necked flask, equipped with an efficient stirring mechanism, a thermometer, and a reflux condenser was charged with 98 grams of 2-methylthiophene, 67.5 grams of the hydrochloride of monomethylamine, and 81 grams of 37 percent aqueous formaldehyde solution. The reaction mass was heated at reflux temperature (86 to 96° C.) for five hours. The reaction mass was then treated with 10 cc. of concentrated hydrochloric acid and extracted four times with benzene. The aqueous fraction separated from the benzene was then cooled and made alkaline with 250 grams of 20 percent sodium hydroxide solution. The oil which then appeared was separated and the aqueous residue then was extracted twice with equal volumes of benzene. All of the benzene extractions were then combined, washed twice with water and dried over anhydrous potassium carbonate. The dried product was then distilled in a Vigreux column, and a fraction boiling at 87° C. and 12 mm. pressure was identified as N,5-dimethyl-2-thenylamine.

*Example 2*

A reaction flask was charged with 55 ml. of a 10 percent aqueous sodium hydroxide solution and 21.2 grams of N,5-dimethyl-2-thenylamine. The flask was then fitted with a reflux condenser and cooled in an ice bath to 15° C. A 9.1 ml. quantity of carbon disulfide was added gradually over a period of ten minutes through the condenser while the flask was periodically cooled to maintain a temperature below 20° C. The reaction mixture was vigorously stirred so as to maintain the reagents in emulsion form. As the reaction approached completion the emulsion disappeared and a clear solution was formed, but when the reaction had been completed a white precipitate appeared. The resulting slurry was then mixed with 22 grams of hydrated zinc acetate dissolved in 100 ml. of water, the addition being completed in fifteen minutes. After stirring the mixture for an additional ten minutes, it was cooled to 5° C. and filtered. The resulting white product was washed with water and dried under an infrared lamp. The resulting compound was identified as the zinc salt of N,5-dimethyl-2-thenyldithiocarbamic acid, having the structural formula:

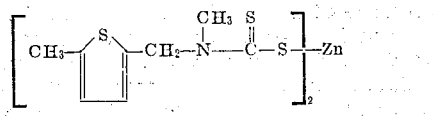

*Example 3*

A 3-necked, half-liter flask was provided with an efficient stirring device, a reflux condenser and a thermometer, and then charged with 31.4 grams of di-2-thenylamine, 55 ml. of 10 percent sodium hydroxide and 45 ml. of water. The flask and its contents was cooled in an ice bath and vigorously stirred to emulsify the contents of the flask. Carbon disulfide was then added dropwise through the condenser in stoichiometric proportions (11.4 g.) at a rate which permitted the maintenance of the temperature between 15 and 20° C. After completion of the addition the mixture was stirred for fifteen minutes at a temperature below 20° C. A solution of 15 grams of zinc chloride in 50 ml. of water was then added gradually while continuing the stirring and cooling. A heavy, pale yellow precipitate was formed which was filtered and washed with water. The resulting compound was identified as the zinc salt of N,N-di-2-thenyldithiocarbamic acid having the structural formula:

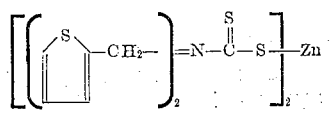

The invention is defined by the following claims.

We claim:
1. A compound having the structural formula:

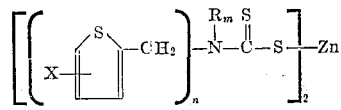

wherein X is a radical of the group consisting of hydrogen, halogen, and alkyl radicals having from one to four carbon atoms, R is a hydrocarbon radical having up to eight carbon atoms, $n$ is a small whole number from one (1) to two (2), inclusive, $m$ is a small whole number from zero (0) to one (1), inclusive, and the sum of $n$ and $m$ is always two (2).

2. A compound having the structural formula:

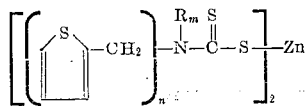

wherein $n$ is a whole number from one (1) to two (2), inclusive, $m$ is a whole number from zero (0) to one (1), inclusive, and R is a hydrocarbon radical having up to eight carbon atoms.

3. The zinc salt of N-methyl-N-(5-methyl-2-thenyl)dithiocarbamic acid having the formula

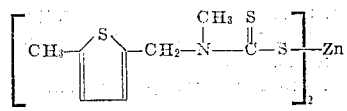

4. The zinc salt of N,N-di-2-thenyldithiocarbamic acid having the formula

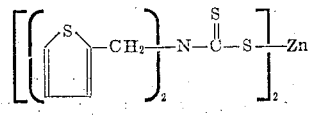

5. The zinc salt of N-methyl-N-(2-thenyl)-dithiocarbamic acid having the formula

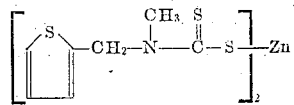

WILLIAM S. EMERSON.
TRACY M. PATRICK, JR.

REFERENCES CITED

The following references are of record in the file of this patent:

UNITED STATES PATENTS

| Number | Name | Date |
|--------|------|------|
| 2,046,884 | Semon | July 7, 1936 |
| 2,229,562 | Gracia | Jan. 21, 1941 |
| 2,492,314 | Olin | Dec. 27, 1949 |

OTHER REFERENCES

Bernthsen and Sudborough: "Organic Chemistry," Van Nostrand, N. Y., 1925, p. 549.

Richter: "Organic Chemistry," Wiley, N. Y., 1938, pp. 649–650.

Whitmore: "Organic Chemistry," Van Nostrand, N. Y., 1937, p. 893.